June 30, 1925.
J. M. CONKLIN
1,544,517
ELECTRIC FOUR-WHEEL AUTOMOBILE TRANSMISSION
Filed Dec. 12, 1923
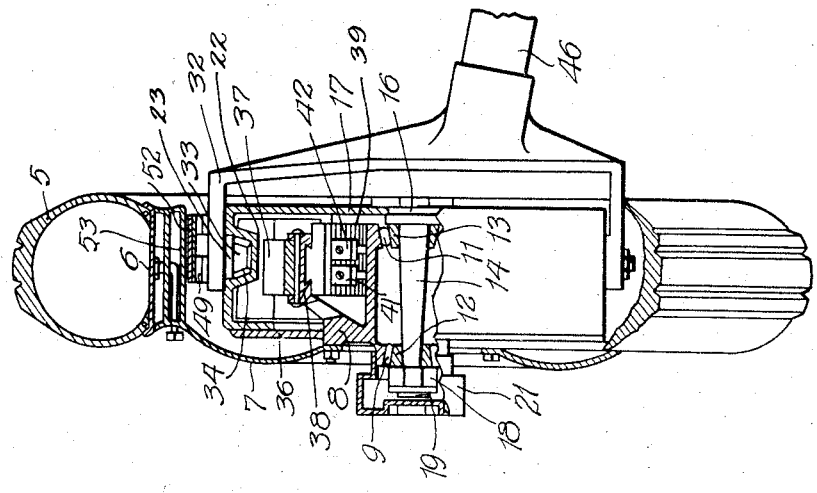
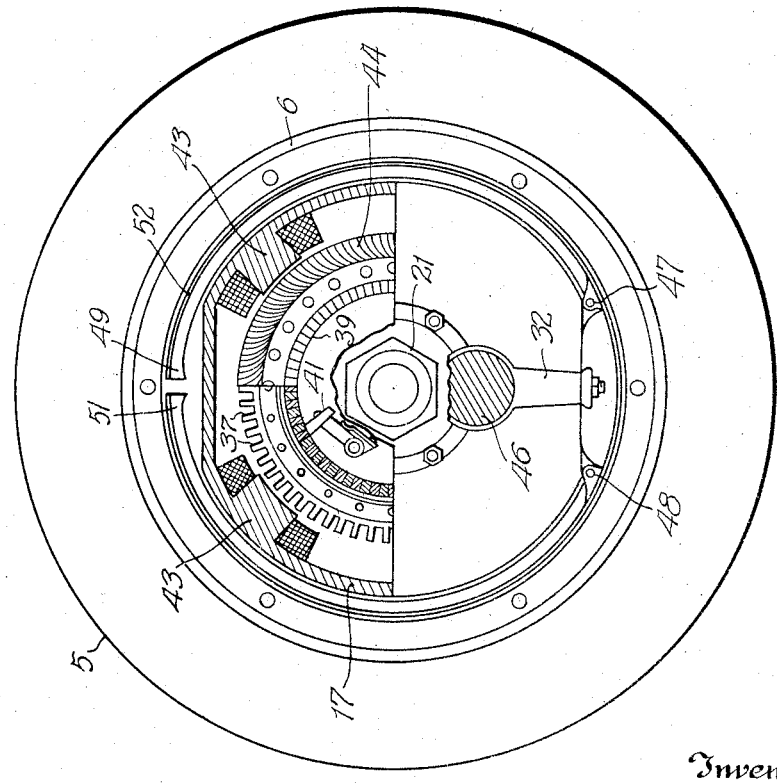
Inventor
J. M. Conklin
Victor J. Evans
Attorney Patented June 30, 1925.

1,544,517

UNITED STATES PATENT OFFICE.

JOHN M. CONKLIN, OF BELL, CALIFORNIA.

ELECTRIC FOUR-WHEEL AUTOMOBILE TRANSMISSION.

Application filed December 12, 1923. Serial No. 680,282.

*To all whom it may concern:*

Be it known that I, JOHN M. CONKLIN, a citizen of the United States, residing at Bell, in the county of Los Angeles and State of California, have invented new and useful Improvements in Electric Four-Wheel Automobile Transmission, of which the following is a specification.

This invention relates to improvements in electric four-wheel automobile transmission.

The principal object of this invention is to provide an electric motor within each wheel of an automobile for the purpose of securing better traction.

Another object is to produce a vehicle which will be simple to operate, free from complicated gearing and one which will also be free from skidding.

Another object is to produce a transmission which is silent in operation, practically frictionless and relatively free from mechanical defects which are produced by driving shafts, universal joints, etc.

A still further object is to provide a structure which will permit braking upon the four wheels.

Other objects and advantages will be apparent during the course of the following description.

In the accompanying drawings forming a part of this specification, and in which like numerals are employed to designate like parts throughout the same, Figure 1 is a side elevation of my wheel partly broken away to show the interior thereof, Figure 2 is an end elevation of one of my wheels partly broken away.

Applicant is aware of the fact that vehicles have been devised wherein power was transmitted to the four wheels. These vehicles, however, have, in most instances, employed complicated gearing arrangements, in order that the power could be transmitted through suitable shafts to each of the four wheels. Applicant has therefore obviated these mechanical difficulties by incorporating in each wheel an electric motor of unusual design.

In the accompanying drawings wherein for the purpose of illustration is shown a preferred embodiment of my invention, the numeral 5 designates the customary pneumatic tire mounted upon a demountable rim 6, which rim, in turn, is secured to a pressed steel disc 7. This disc 7 is bolted to a casting 8 which, in turn, contacts roller bearings 9 and 11, which roller bearings contact cones 12 and 13, respectively, secured upon a stub axle 14. This stub axle is tapered and is secured as at 16 to the motor housing 17.

A retaining nut 18 is screw-threaded to the opposite end of the stub shaft as is also a lock nut 19. A hub cap 21 is, in turn, secured to the casting 8 as is best shown in Figure 2. The motor housing 17 has formed therein depressions, one of which is shown in Figure 2 at 22. The other depression is similar and is formed diametrically opposite. These depressions serve to pivotally support a yoke 23 upon each end of which is mounted an inwardly extending cone 33 between which cone and the depression 22 is positioned roller bearings 34.

A plate 36 serves to close the motor housing and at 37 is shown an armature secured by suitable bolts to a ring 38 formed upon the casting 8. This ring also supports a commutator 39 built up of the usual segments. This commutator is ring-shaped so that brushes 41 and 42 contact the interior surface thereof. These brushes are, in turn, supported upon the motor housing in a convenient manner.

Pole pieces 43 are formed on the motor housing and approach the armature 37 upon which the customary armature windings 44 are placed. The yoke 32 is secured to the axle 46 of the vehicle. It is of course obvious that the rear wheels may be or may not be pivoted, depending upon the desires of the manufacturer. In the case where the rear wheels are not pivoted, the yoke 32 is rigidly secured to the motor housing.

Pivoted as at 47 and 48 to the motor housing, are two semi-circular brake members, with free ends shown at 49 and 51. These ends are pushed apart as is customary in expanding brakes by a suitable cam arrangement (not shown). A brake lining 52 is mounted upon each of the brake members and serves to contact the flat inwardly extending portion 53 of the disc 7 thus forming a braking means for the wheel.

The action of an electric motor is well-known and needs no further discussion other than to call attention to the fact that brushes 41 and 42 operate within the commutator rather than over the outer surface thereof as is customary. These motors are preferably series wound and are adapted to stand a large over-load.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

A motor adapted to be mounted in a vehicle wheel and comprising a housing, a stub axle rigidly secured to said housing, a casting rotatably mounted on said stub axle, an armature formed on said casting, a ring-shaped commutator secured to said casting and arranged within the circumferential plane of said armature, brushes adapted to contact the inner periphery of said ring-shaped commutator, a yoke pivotally secured to said housing, a disc secured to said casting, said disc having an inwardly extending portion, semi-circular brake bands pivoted to said housing and adapted to contact said inwardly extending portion of said disc, for the purpose of causing braking action therewith, substantially as and for the purpose specified.

In testimony whereof I affix my signature.

JOHN M. CONKLIN.